(12) United States Patent
Chae et al.

(10) Patent No.: US 11,031,594 B2
(45) Date of Patent: Jun. 8, 2021

(54) POSITIVE ELECTRODE FOR RECHARGEABLE LITHIUM BATTERY, RECHARGEABLE LITHIUM BATTERY INCLUDING SAME AND BATTERY MODULE

(71) Applicant: Samsung SDI Co., Ltd., Yongin-si (KR)

(72) Inventors: Youngjoo Chae, Yongin-si (KR); Kitae Kim, Yongin-si (KR); Young-Ki Kim, Yongin-si (KR); Jungjoon Park, Yongin-si (KR); Dong-Hwan Yu, Yongin-si (KR); Soonrewl Lee, Yongin-si (KR); Hyerim Lee, Yongin-si (KR); Ickkyu Choi, Yongin-si (KR); Soonkie Hong, Yongin-si (KR); Kisoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 48 days.

(21) Appl. No.: 16/192,729

(22) Filed: Nov. 15, 2018

(65) Prior Publication Data
US 2019/0148726 A1 May 16, 2019

(30) Foreign Application Priority Data
Nov. 16, 2017 (KR) .......................... 10-2017-0153158

(51) Int. Cl.
*H01M 4/525* (2010.01)
*H01M 4/505* (2010.01)
(Continued)

(52) U.S. Cl.
CPC .......... *H01M 4/525* (2013.01); *H01M 4/366* (2013.01); *H01M 4/485* (2013.01); *H01M 4/505* (2013.01);
(Continued)

(58) Field of Classification Search
CPC ...... H01M 4/525; H01M 4/366; H01M 4/485; H01M 4/505; H01M 2004/028
See application file for complete search history.

(56) References Cited

U.S. PATENT DOCUMENTS

2002/0192557 A1* 12/2002 Choi .................... H01M 4/0416
429/232
2004/0253518 A1* 12/2004 Hosoya .................... H01M 4/13
429/232
(Continued)

FOREIGN PATENT DOCUMENTS

EP 3226331 A1 10/2017
JP 2009-076279 A 4/2009
(Continued)

OTHER PUBLICATIONS

EPO Extended Search Report dated Dec. 20, 2018, for corresponding European Patent Application 18206184.6 (8 pages).
(Continued)

*Primary Examiner* — Milton I Cano
*Assistant Examiner* — Jenna Shulman
(74) *Attorney, Agent, or Firm* — Lewis Roca Rothgerber Christie LLP (57) ABSTRACT

A positive active material for a rechargeable lithium battery, and a rechargeable lithium battery and a battery module including the same are provided. The positive active material may include a lithium nickel-manganese-cobalt composite oxide with a coating layer on the surface. The coating layer on the surface may include a lithium oxide including Al and/or W, for example, Al and W.

12 Claims, 6 Drawing Sheets

(51) Int. Cl.
    *H01M 10/0525*      (2010.01)
    *H01M 4/485*      (2010.01)
    *H01M 4/36*      (2006.01)
    *H01M 4/02*      (2006.01)

(52) U.S. Cl.
    CPC .. *H01M 10/0525* (2013.01); *H01M 2004/028* (2013.01)

(56) References Cited

U.S. PATENT DOCUMENTS

| | | |
|---|---|---|
| 2012/0015250 A1 | 1/2012 | Teng et al. |
| 2014/0099545 A1 | 4/2014 | Cho et al. |
| 2014/0329146 A1* | 11/2014 | Niina ............ H01M 4/505 429/223 |
| 2015/0147655 A1 | 5/2015 | Park et al. |
| 2015/0287984 A1 | 10/2015 | Kong et al. |
| 2016/0336595 A1 | 11/2016 | Choi et al. |

FOREIGN PATENT DOCUMENTS

| | | |
|---|---|---|
| JP | 2015-072818 A | 4/2015 |
| KR | 10-2015-0090862 A | 8/2015 |
| KR | 10-2016-0059948 A | 5/2016 |
| KR | 10-2016-0118081 A | 10/2016 |
| KR | 10-1667968 B1 | 10/2016 |

OTHER PUBLICATIONS

Korean Intellectual Property Office Action (Korean only) for corresponding Korean Application No. 10-2017-0153158, dated Apr. 10, 2020, 6 pages.

* cited by examiner

POSITIVE ELECTRODE FOR RECHARGEABLE LITHIUM BATTERY, RECHARGEABLE LITHIUM BATTERY INCLUDING SAME AND BATTERY MODULE

CROSS-REFERENCE TO RELATED APPLICATION

This application claims priority to and the benefit of Korean Patent Application No. 10-2017-0153158 filed in the Korean Intellectual Property Office on Nov. 16, 2017, the entire content of which is incorporated herein by reference.

BACKGROUND

1. Field

One or more aspects of example embodiments of the present disclosure are related to a positive active material for a rechargeable lithium battery, and a rechargeable lithium battery and a battery module including the same.

2. Description of the Related Art

Rechargeable lithium batteries have recently drawn attention as power sources for small portable electronic devices.

A rechargeable lithium battery includes a positive electrode including a positive active material, a negative electrode including a negative active material, a separator between the positive electrode and negative electrode, and an electrolyte.

The negative active material may include any suitable carbon-based material capable of intercalating/deintercalating lithium, such as artificial graphite, natural graphite, hard carbon, and/or the like, and/or a silicon (Si)-based active material.

The positive active material may include a lithium transition metal oxide having a structure capable of intercalating lithium ions, such as $LiCoO_2$, $LiMn_2O_4$, $LiNi_{1-x}Co_xO_2$ (0<x<1), and/or $LiNi_{1-x-y}Co_xA_yO_2$ (0<x+y<1, where A is Mn or Al).

Some rechargeable lithium batteries including a positive active material in the related art have suitable high temperature performance but small (low) capacities, such that the number of cells must be increased in order to achieve a suitable capacity. Ni-based and NCM-based (nickel-cobalt-manganese-based) lithium oxides have been used in higher concentrations to obtain higher capacities, but these positive active materials including high concentrations of Ni-based and NCM-based (nickel-cobalt-manganese-based) lithium oxides have shown deteriorated characteristics at high temperatures.

SUMMARY

One or more aspects of example embodiments of the present disclosure are directed toward a positive active material for a rechargeable lithium battery capable of improving output and cycle-life characteristics at high temperatures, room temperatures, and/or at low temperatures.

One or more example embodiments of the present disclosure provide a rechargeable lithium battery including the positive active material.

One or more example embodiments of the present disclosure provide a battery module including the rechargeable lithium battery.

One or more example embodiments of the present disclosure provide a positive active material for a rechargeable lithium battery including a lithium nickel-manganese-cobalt composite oxide and a coating layer on the surface of the a lithium nickel-manganese-cobalt composite oxide, wherein the coating layer includes aluminum (Al) and tungsten (W).

The lithium nickel-manganese-cobalt composite oxide may include nickel in the largest amount of nickel, manganese, and cobalt (e.g., the concentration of nickel may be larger than the respective concentrations of manganese and cobalt).

The lithium nickel-manganese-cobalt composite oxide may be represented by Chemical Formula 1:

Chemical Formula 1

$Li_{a1}Ni_{x1}Co_{y1}Mn_{z1}M_wO_2.$

In Chemical Formula 1, 0.9≤a1≤1.25, 0.4≤x1≤0.95, 0.1≤y1≤0.3, 0.1≤z1≤0.3, 0≤w≤0.3, and x1+y1+z1+w=1, and M may be at least one metal selected from boron (B), lithium (Li), magnesium (Mg), aluminum (Al), calcium (Ca), strontium (Sr), chromium (Cr), vanadium (V), titanium (Ti), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), and a combination thereof.

The lithium nickel-manganese-cobalt composite oxide may be coated with a lithium oxide including Al and/or W on its surface.

The lithium oxide including Al and/or W may be represented by Chemical Formula 2:

Chemical Formula 2

$Li_aW_bAl_cO_d.$

In Chemical Formula 2, 0.5≤a≤2, 0<b≤3, 0<c≤4, and 1≤d≤6.

The lithium oxide including Al and/or W may be "at least one of $LiAlO_2$, $LiAl_2O_4$, and $Li_2AlO_3$", "at least one of $LiWO_3$ and $Li_2WO_3$", or a combination thereof.

The lithium oxide including Al and/or W may be in an island shape on the surface of the lithium nickel-manganese-cobalt composite oxide.

The positive active material may have an average particle diameter (D50) of about 2 μm to about 10 μm.

The positive active material may have a porous structure.

One or more example embodiments of the present disclosure provide a rechargeable lithium battery including the positive electrode including a positive active material; a negative electrode including a negative active material, and an electrolyte.

One or more example embodiments of the present disclosure provide a battery module including the rechargeable lithium battery as a unit battery.

Other embodiments of the present disclosure are included in the following detailed description.

The positive active material for a rechargeable lithium battery according to one or more embodiments of the present disclosure may provide a rechargeable lithium battery having improved output characteristics at room temperatures and/or at low temperatures, and/or improved high temperature cycle-life characteristics.

DETAILED DESCRIPTION

Reference will now be made in more detail to example embodiments, examples of which are illustrated in the accompanying drawings, wherein like reference numerals refer to like elements throughout and duplicative descriptions thereof may not be provided. In this regard, the present example embodiments may have different forms and should not be construed as being limited to the descriptions set forth herein. Accordingly, the example embodiments are merely described below, by referring to the drawings, to explain aspects of the present description.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

As used herein, when a definition is not otherwise provided, the term "average particle diameter (D50)" refers to the particle diameter corresponding to the 50th percentile (50%) of particles in a particle distribution curve with respect to increasing particle diameter, as measured by PSA (particle size analyzer).

Figure 1:
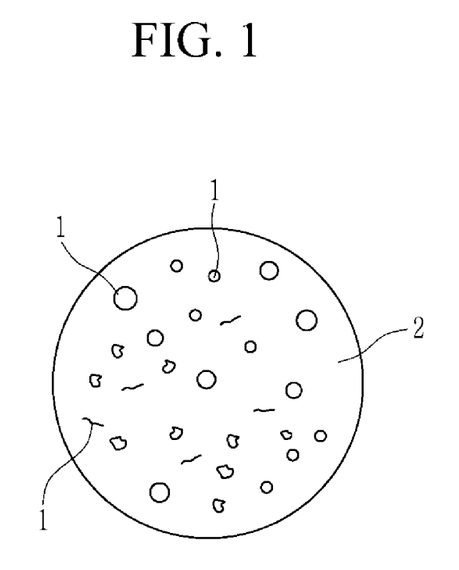
FIG. 1 is a schematic view showing a positive active material particle according to one or more embodiments of the present disclosure, including its outer surface.

Hereinafter, referring to FIG. 1, a positive active material for a rechargeable lithium battery according to one or more embodiments of the present disclosure is described. FIG. 1 is a schematic view showing a positive active material particle according to one or more embodiments of the present disclosure, including its outer surface.

Referring to FIG. 1, a positive active material for a rechargeable lithium battery according to one or more embodiments of the present disclosure includes a lithium nickel-manganese-cobalt composite oxide 2 and a coating layer 1 on the surface of the nickel-manganese-cobalt composite oxide 2. The coating layer 1 includes aluminum (Al) and/or tungsten (W). FIG. 1 shows that the lithium nickel-manganese-cobalt composite oxide 2 and the coating layer 1 are formed to have a sphere-like shape, but the present disclosure is not limited thereto and may have any suitable shape.

The lithium nickel-manganese-cobalt composite oxide may include nickel in the largest amount of nickel, manganese, and cobalt, for example, the lithium nickel-manganese-cobalt composite oxide comprises nickel in an amount larger than respective amounts of manganese and cobalt (e.g., the concentration of nickel is larger than the respective concentrations of manganese and cobalt).

The lithium nickel-manganese-cobalt composite oxide may be represented by Chemical Formula 1:

$$Li_{a1}Ni_{x1}Co_{y1}Mn_{z1}M_wO_2.$$  Chemical Formula 1

In Chemical Formula 1, $0.9 \leq a1 \leq 1.25$, $0.4 \leq x1 \leq 0.95$, $0.1 \leq y1 \leq 0.3$, $0.1 \leq z1 \leq 0.3$, $0 \leq w \leq 0.3$, $x1+y1+z1+w=1$, and M may be at least one metal selected from boron (B), lithium (Li), magnesium (Mg), aluminum (Al), calcium (Ca), strontium (Sr), chromium (Cr), vanadium (V), titanium (Ti), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), and a combination thereof.

In Chemical Formula 1, M may be at least one metal selected from Zr, Ti, Al, Mg, and a combination thereof.

When the lithium nickel-manganese-cobalt composite oxide represented by Chemical Formula 1 has a high Ni content, the charge and discharge capacity, efficiency, and cycle-life characteristics of a rechargeable lithium battery including this material may be improved. In some embodiments, these effects may be obtained in a positive active material including nickel in a large content (high Ni), for example, in a Ni mole ratio x1 of about 0.4 to about 0.95 as shown in Chemical Formula 1, about 30 mol % to about 95 mol %, about 50 mol % to about 90 mol %, or about 60 mol % to about 80 mol % based on 100 mol % of (e.g., the metal content of) the lithium nickel-manganese-cobalt composite oxide.

The lithium nickel-manganese-cobalt composite oxide may be coated with a lithium oxide including Al and/or W on its surface.

The lithium nickel-manganese-cobalt composite oxide coated with the lithium oxide including Al and/or W may improve output and cycle-life characteristics at room temperatures, low temperatures, and/or at high temperatures and may also have high efficiency (high capacity) compared with materials without the coating.

The lithium oxide including Al and/or W may be represented by Chemical Formula 2:

$$Li_aW_bAl_cO_d.$$  Chemical Formula 2

In Chemical Formula 2, $0.5 \leq a \leq 2$, $0 < b \leq 3$, $0 < c \leq 4$, and $1 \leq d \leq 6$.

For example, in Chemical Formula 2, $0.7 \leq a \leq 2$, $1 \leq b \leq 2$, $1 \leq c \leq 2$, and $1 \leq d \leq 4$.

For example, the lithium oxide including Al and/or W may be at least one of $LiAlO_2$, $LiAl_2O_4$, and $Li_2AlO_3$, at least one of $LiWO_3$ and $Li_2WO_3$, or a combination thereof, but embodiments of the lithium oxide including Al and/or W are not limited thereto.

The lithium oxide including Al and/or W may be in an island shape or form on the surface of the lithium nickel-manganese-cobalt composite oxide. In some embodiments, the lithium oxide including Al and/or W may be uniformly (e.g., substantially uniformly) dispersed on the entire surface of the lithium nickel-manganese-cobalt composite oxide rather than in the island shape. In some embodiments, the island shape may have a smaller sheet resistance, and thus may improve battery performance.

The positive active material may have an average particle diameter (D50) of about 2 μm to about 10 μm, for example about 2 μm to about 7 μm, or about 2 μm to about 5 μm. When the positive active material has an average particle diameter (D50) within this range, active mass density (for example, the energy density) may be improved.

The positive active material may have a porous structure. For example, the positive active material may be a porous compound including one or more internal pores. The pore size and porosity (e.g., pore volume) are not particularly limited, and when the positive active material is a porous compound, the capacity and efficiency of the battery may be increased.

A method of manufacturing the positive active material for a rechargeable lithium battery according to one or more embodiments of the present disclosure may include the following processes, but is not limited thereto:

(a) mixing a nickel compound, a manganese compound, and a cobalt compound to produce a uniform (e.g., substantially uniform) mixture;

(b) adding a lithium compound to the mixture and heat-treating the same to obtain a layered lithium nickel-manganese-cobalt composite oxide; and (c) forming a coating layer including Al and/or W on the surface of the layered lithium nickel-manganese-cobalt composite oxide to obtain a lithium nickel-manganese-cobalt positive active material.

Non-limiting examples of the nickel compound may include $Ni(OH)_2$, NiO, NiOOH, $NiCO_3$, $2Ni(OH)_2.4H_2O$, $NiC_2O_4.2H_2O$, $Ni(NO_3)_2.6H_2O$, $NiSO_4$, $NiSO_4.6H_2O$, a nickel fatty acid salt, and a nickel halide. In some embodiments, a nickel compound that does not include a nitrogen atom or a sulfur atom (such as $Ni(OH)_2$, NiO, NiOOH, $NiCO_3$, $2Ni(OH)_2.4H_2O$, and/or $NiC_2O_4.2H_2O$) may be used in order to prevent or reduce generation of harmful gases such as $NO_x$, $SO_x$, and/or the like during the firing process. These nickel compounds may be used alone or as a mixture of two or more.

Non-limiting examples of the manganese compound may include a manganese oxide (such as $Mn_2O_3$, $MnO_2$, $Mn_3O_4$, and/or the like), and a manganese salt (such as $MnCO_3$, $Mn(NO_3)_2$, $MnSO_4$, manganese acetate, manganese dicarboxylate, manganese citrate, a manganese salt of a fatty acid or oxyhydroxide, and/or a manganese halide (such as manganese chloride)). In some embodiments, the manganese compound may be an inexpensive and commercially available industrial material that does not generate harmful gases (such as $NO_x$, $SO_x$, and/or $CO_2$) during the firing process, for example, $MnO_2$, $Mn_2O_3$, and/or $Mn_3O_4$. These manganese compounds may be used alone or as a mixture of two or more.

Non-limiting examples of the cobalt compound may include $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, and $Co(SO_4)_2.7H_2O$. In some embodiments, the cobalt compound may be a compound that does not generate harmful materials (such as $NO_x$, $SO_x$, and/or the like) during firing, for example, $Co(OH)_2$, CoOOH, CoO, $Co_2O_3$, and/or $Co_3O_4$. In some embodiments, the cobalt compound may be an industrially inexpensive and highly reactive compound, such as $Co(OH)_2$ and/or CoOOH. The cobalt compounds may be used alone or as a mixture of two or more.

The raw materials may be mixed using any suitable method, which is not particularly limited and may include a wet or dry process. For example, the method may use a ball mill, a vibration mill, a bead mill, and/or the like. In some embodiments, wet mixing may yield a more uniform (e.g., substantially uniform) mixture and may increase the reactivity of the mixture during the firing process.

The mixing time may be selected according to the mixing method. In some embodiments, the mixing time may be selected so that the raw materials are uniformly (e.g., substantially uniformly) mixed at the particle level. For example, the ball mill (wet or dry mixing) mixing time may be about 1 hour to about 2 days, while the bead mill (wet, substantially continuous mixing) mixing time may be about 0.1 hour to about 6 hours.

After wet mixing, the particles may be dried using any suitable method. The drying method is not particularly limited. In some embodiments, a spray-drying method may be used to yield sufficient particle uniformity, powder fluidity and/or powder-treatment performance, and/or efficient formation of spherical secondary particles. In some embodiments, the powders obtained using the spray-drying method may be mixed with a lithium compound (such as $Li_2CO_3$, $LiNO_3$, $LiNO_2$, LiOH, $LiOH.H_2O$, LiH, LiF, LiCl, LiBr, LiI, $CH_3OOLi$, $Li_2O$, $Li_2SO_4$, a lithium dicarboxylate salt, lithium citrate, a lithium fatty acid salt, and/or an alkyl lithium). In some embodiments, a Li: (Ni+Co+Mn) mole ratio in the resulting mixture may be greater than about 1:1. For example, the mole ratio may be about 1.01:1 to about 1.06:1, or about 1.02:1 to about 1.05:1.

The layer-phased lithium nickel-manganese-cobalt composite oxide may be prepared by adding a doping material (e.g., dopant) along with the lithium compound to a uniform (e.g., substantially uniform) mixture of the nickel compound, the manganese compound, and the cobalt compound. The doping material may use a compound including Ba, Mg, Al, Fe, Ti, W, B, Zr, or a combination thereof, for example, Al, Zr, or a combination thereof.

This obtained powder mixture may be subjected to a primary (first) firing (heat-treatment). This primary firing may be performed using conditions selected according to the powder mixture composition and the lithium compound raw material used therein. The primary firing may be performed at greater than or equal to about 700° C. and less than or equal to about 1100° C., for example, less than or equal to about 1075° C., or less than or equal to about 1050° C. The primary firing may be carried out by maintaining the temperature condition for a set or predetermined time, and then decreasing the temperature to a final temperature of about 10° C. to about 40° C. at a set or predetermined rate.

Subsequently, a coating layer including Al and/or W may be formed on the surface of the lithium nickel-manganese-cobalt composite oxide to yield a positive active material. Herein, the coating may be performed using a solid-phase reaction method such as mixing an Al and/or W-containing compound and the lithium nickel-manganese-cobalt composite oxide and reacting them at an appropriate or suitable temperature; dissolving the Al and/or W-containing compound in a solvent and dispersing/spraying the solution in the lithium nickel-manganese-cobalt composite oxide; a gas-phase reaction method; and/or the like, but embodiments of the present disclosure are present disclosure are not limited thereto.

After the Al and/or W-containing compound is mixed with (e.g., added to) the lithium nickel-manganese-cobalt positive active material, the mixture may be subjected to a secondary firing (heat treatment) to obtain a positive active material according to one or more embodiments of the present disclosure. The secondary firing may be performed at greater than or equal to about 600° C. and less than or equal to about 1000° C., for example, less than or equal to about 975° C., or less than or equal to about 950° C. The secondary firing may be carried out by maintaining the temperature condition for a set of predetermined time, and then decreasing the temperature at a set or predetermined rate to a final temperature of about 10° C. to about 40° C. to obtain a positive active material according to one or more embodiments of the present disclosure.

Another embodiment of the present disclosure provides a rechargeable lithium battery including the positive electrode including the positive active material; a negative electrode; and an electrolyte.

The positive electrode may include a current collector, and a positive active material layer on the current collector and including a positive active material.

In the positive active material layer, an amount of the positive active material may be about 90 wt % to about 98 wt % based on the total weight of the positive active material layer. In some embodiments, the positive active material layer may further include a binder and a conductive material. The binder and the conductive material may each independently be included in an amount of about 1 wt % to about 5 wt % based on the total amount of the positive active material layer.

The binder may include polyvinyl alcohol, carboxylmethyl cellulose, hydroxypropyl cellulose, diacetyl cellulose, polyvinylchloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and/or the like, but embodiments of the present disclosure are not limited thereto.

The conductive material may include a carbon-based material (such as natural graphite, artificial graphite, carbon black, acetylene black, KETJENBLACK®, a carbon fiber, and/or the like); a metal-based material (such as a metal powder and/or a metal fiber including copper, nickel, aluminum, silver, and/or the like); a conductive polymer (such as a polyphenylene derivative and/or the like); or a mixture thereof.

The current collector may include an aluminum foil, a nickel foil, or a combination thereof, but embodiments of the present disclosure are not limited thereto.

The negative electrode may include a current collector, and a negative active material layer on the current collector and including a negative active material.

The negative active material may include a material capable of reversibly intercalating/deintercalating lithium ions, a lithium metal, a lithium metal alloy, a material capable of doping/dedoping lithium, and/or transition metal oxide. The material capable of reversibly intercalating/deintercalating lithium ions may include a carbon material. The carbon material may be any suitable carbon-based negative active material available in the art for a lithium ion secondary battery. Non-limiting examples of the carbon material may include crystalline carbon, amorphous carbon, and a combination thereof. In some embodiments, the crystalline carbon may be a non-shaped carbon (e.g., carbon having an unspecified shape), or a sheet, flake, spherical, or fiber shaped natural graphite and/or artificial graphite. The amorphous carbon may be a soft carbon (carbon obtained by sintering at a low temperature), a hard carbon, a mesophase pitch carbonized product, fired coke, and/or the like.

The lithium metal alloy may include lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), tin (Sn), and mixtures thereof.

The material capable of doping/dedoping lithium may include Si, $SiO_x$ ($0<x<2$), a Si-Q alloy (wherein Q is selected from an alkali metal, an alkaline-earth metal, a Group 13 element, a Group 14 element excluding Si, a Group 15 element, a Group 16 element, a transition metal, a rare earth element, and combinations thereof), Sn, $SnO_2$, a Sn—R alloy (wherein R is selected from an alkali metal, an alkaline-earth metal, a Group 13 element, a Group 14 element excluding Sn, a Group 15 element, a Group 16 element, a transition metal, a rare earth element, and combinations thereof), and/or the like. At least one of them may be mixed with $SiO_2$. The elements Q and R may be selected from Mg, Ca, Sr, Ba, Ra, scandium (Sc), yttrium (Y), titanium (Ti), Zr, hafnium (Hf), rutherfordium (Rf), vanadium (V), niobium (Nb), tantalum (Ta), dubnium (Db), Cr, molybdenum (Mo), tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), Zn, cadmium (Cd), B, Al, gallium (Ga), Sn, In, Ge, P, arsenic (As), antimony (Sb), bismuth (Bi), sulfur (S), selenium (Se), tellurium (Te), polonium (Po), and combinations thereof.

The transition metal oxide may include a vanadium oxide, a lithium vanadium oxide, and/or a lithium titanium oxide.

In the negative active material layer, the negative active material may be included in an amount of about 95 wt % to about 99 wt % based on the total weight of the negative active material layer.

In some embodiments, the negative active material layer may include a binder, and optionally a conductive material. In the negative active material layer, the amount of the binder may be about 1 wt % to about 5 wt % based on the total weight of the negative active material layer. When the negative active material layer further includes the conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of the negative active material particles with itself and with a current collector. The binder may be a non-water-soluble binder, a water-soluble binder, or a combination thereof.

The non-water-soluble binder may be or include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be or include a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylenediene copolymer, polyvinylpyridine, chlorosulfonated polyethylene, a latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound may include one or more of carboxylmethyl cellulose, hydroxypropylmethyl cellulose, methyl cellulose, or an alkali metal salt thereof. The alkali metal may be Na, K, and/or Li. The thickener may be included in an amount of about 0.1 to about 3 parts by weight based on 100 parts by weight of the negative active material.

The conductive material may include a carbon-based material (such as natural graphite, artificial graphite, carbon black, acetylene black, KETJENBLACK®, a carbon fiber, and/or the like); a metal-based material (such as a metal powder and/or a metal fiber including copper, nickel, aluminum, silver, and/or the like); a conductive polymer (such as a polyphenylene derivative); and/or a mixture thereof.

The current collector may include one selected from a copper foil, a nickel foil, a stainless steel foil, a titanium foil, a nickel foam, a copper foam, a polymer substrate coated with a conductive metal, and a combination thereof.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethylacetate, methylpropionate, ethylpropionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (wherein R is a C2 to C20 linear, branched, or cyclic hydrocarbon group, a double bond, an aromatic ring, or an ether bond), and/or the like, amides (such as dimethyl formamide and/or the like), dioxolanes (such as 1,3-dioxolane and/or the like), sulfolanes, and/or the like.

The non-aqueous organic solvent may be used alone or in a mixture. When the organic solvent is used in a mixture, the mixing ratio may be selected to enable a desirable or suitable battery performance.

In addition, the organic solvent may further include an aromatic hydrocarbon-based organic solvent. Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include vinylene carbonate and/or an ethylene carbonate-based compound as an additive for improving cycle life.

Non-limiting examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate or suitable range.

The lithium salt dissolved in an organic solvent supplies a battery with lithium ions, operates the rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example an integer ranging from 1 to 20, LiCl, LiI, and $LiB(C_2O_4)_2$ (lithium bis(oxalato) borate (LiBOB). A concentration of the lithium salt may be about 0.1 M to about 2.0 M. When the lithium salt is included in the above concentration, the electrolyte may have excellent performance and lithium ion mobility due to optimal or suitable electrolyte conductivity and viscosity.

The rechargeable lithium battery may further include a separator between the negative electrode and the positive electrode, depending on the kind or type of rechargeable lithium battery. Non-limiting examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
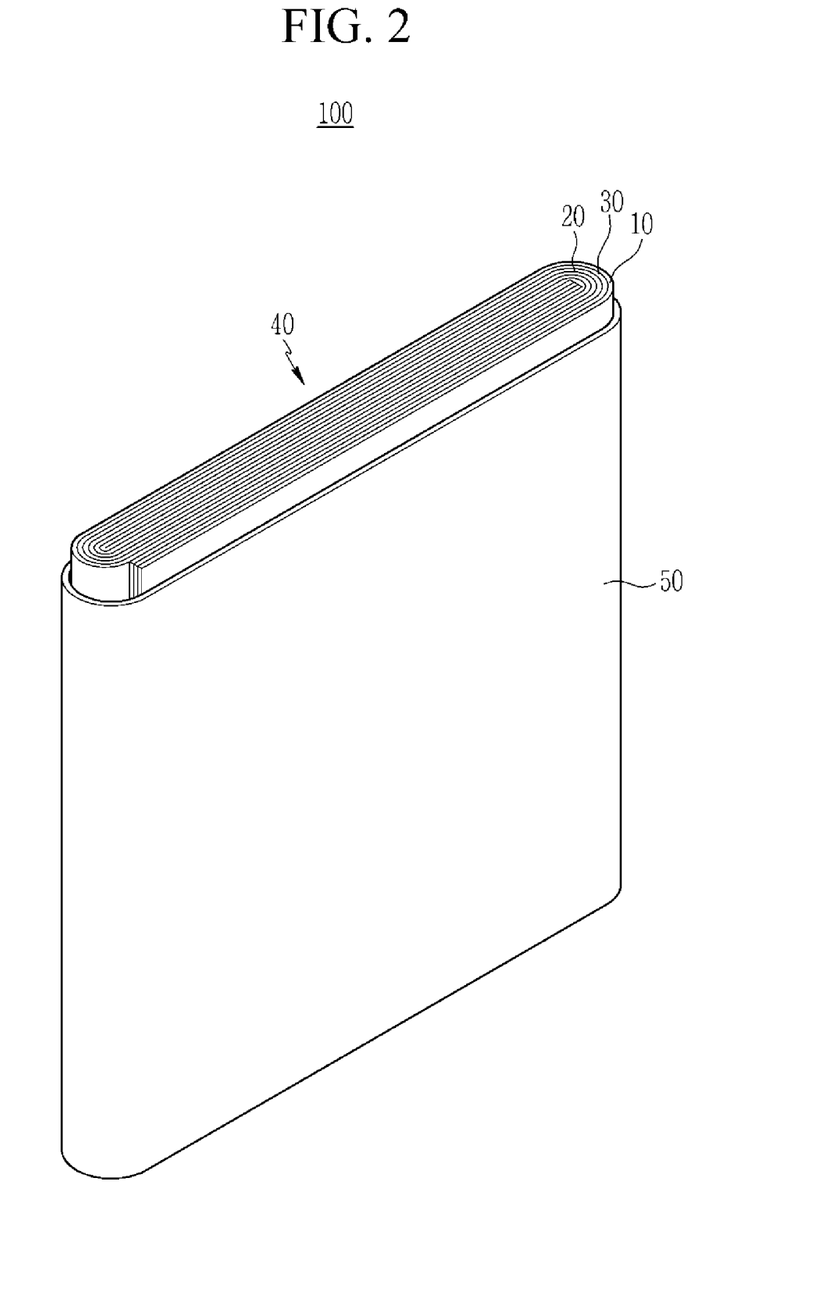
FIG. 2 is a schematic view showing the structure of a rechargeable lithium battery according to one or more embodiments of the present disclosure.

FIG. 2 is an exploded perspective view of a rechargeable lithium battery according to an embodiment of the present disclosure. The rechargeable lithium battery according to an embodiment of the present disclosure is illustrated as a prismatic battery, but is not limited thereto and may have any suitable shape, such as a cylindrical battery, a pouch battery, and the like.

Referring to FIG. 2, a rechargeable lithium battery 100 according to an embodiment of the present disclosure includes an electrode assembly 40 manufactured by winding a positive electrode 10, a negative electrode 20, and a separator 30 interposed between the electrodes, and a case 50 housing the electrode assembly 40. An electrolyte may be impregnated in the positive electrode 10, the negative electrode 20, and the separator 30.

In some embodiments, the rechargeable lithium battery may not only be used as a battery cell used as a power source for a small device but also as a unit battery cell in a medium or large battery module including a plurality of battery cells.

In some embodiments, a battery pack may include the battery module as a power source for a medium or large device. The medium or large device may be an electric vehicle such as an electric vehicle (EV), a hybrid electric vehicle (HEV), a plug-in hybrid electric vehicle (PHEV), or a power storage device, but embodiments of the present disclosure are not limited thereto.

Hereinafter, examples of the present disclosure and comparative examples are described. These examples, however, are not in any sense to be interpreted as limiting the scope of the disclosure.

Example 1

Lithium carbonate ($Li_2CO_3$) and $Ni_{0.60}Co_{0.20}Mn_{0.20}(OH)_2$ were mixed to a Li:(Ni+Co+Mn) mole ratio of 1.03:1 to prepare a first mixture.

The first mixture was heated up to 850° C. at 5° C./min, allowed to stand at 850° C. for 5 hours, and then cooled down to 25° C. at 5° C./min to prepare a compound represented by $Li_{1.03}Ni_{0.60}Co_{0.20}Mn_{0.20}O_2$. This primary heat treatment was performed at a charge height of 5 cm under an air atmosphere.

The compound represented by $Li_{1.03}Ni_{0.60}Co_{0.20}Mn_{0.20}O_2$ was mixed with $WO_3$ and $Al_2O_3$ to prepare a mixture.

The mixture was heated up to 750° C. at 5° C./min, allowed to stand at 750° C. for 5 hours, and cooled down to 25° C. at 5° C./min. This secondary heat treatment was performed under an $O_2$ atmosphere.

Through this secondary heat treatment, the compound represented by $Li_{1.03}Ni_{0.60}Co_{0.20}Mn_{0.20}O_2$ was coated with $LiAlWO_4$ to prepare a positive active material.

Herein, an average particle diameter (D50) of the positive active material was 4 μm.

Comparative Example 1

A positive active material was prepared according to substantially the same method as Example 1, except for not using $WO_3$ (using only $Al_2O_3$).

Evaluation 1

An elemental analysis of the positive active materials according to Example 1 and Comparative Example 1 was obtained from the surface by XPS (X-ray Photoelectron Spectroscopy) after sputtering argon thereon. The sputtering was performed by using argon ions at a sputtering rate of 0.5 nm/min ($SiO_2$ conversion).

Figure 3:
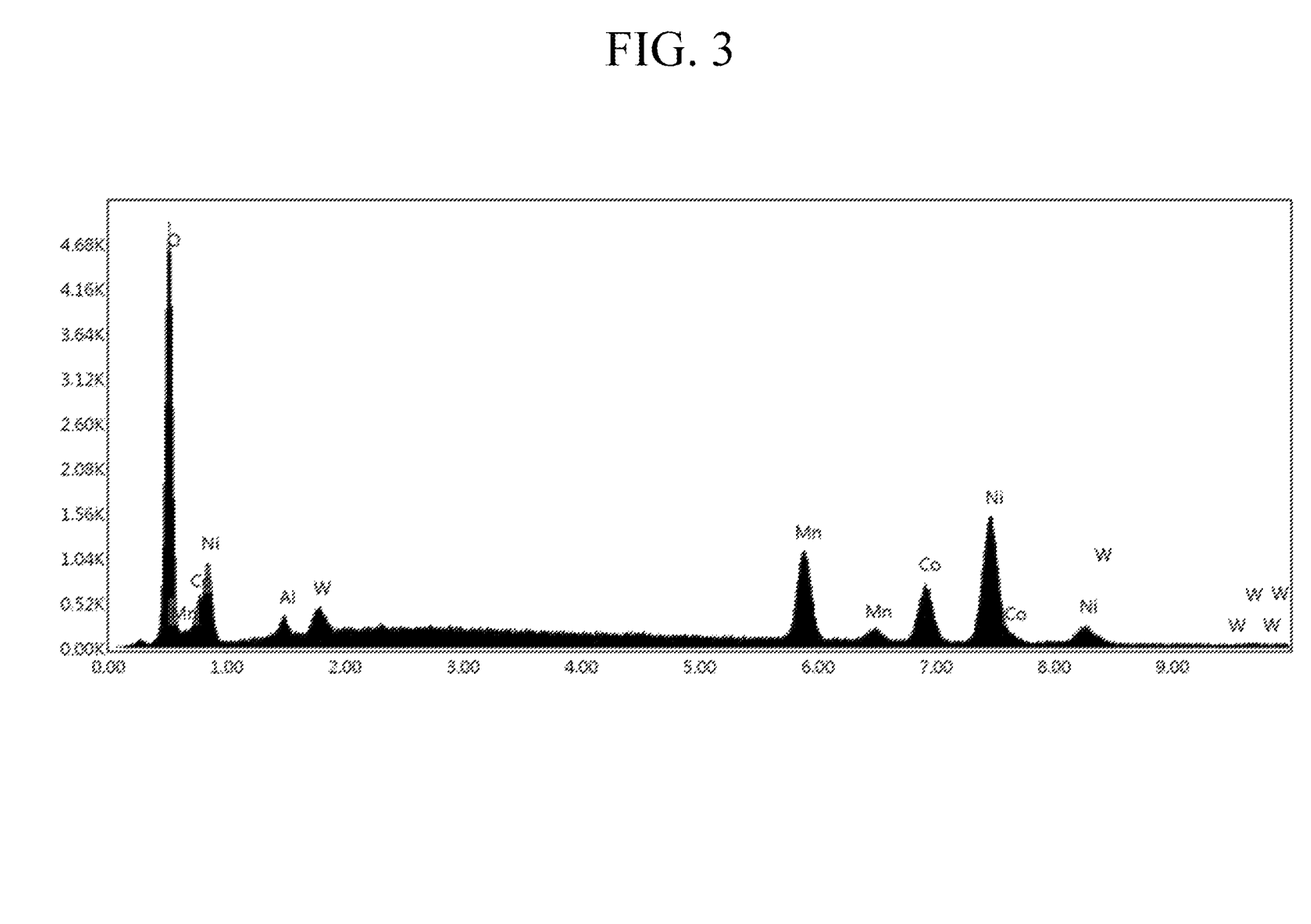
FIG. 3 is a graph showing an X-ray photoelectron spectroscopy (XPS) analysis result (e.g., spectrum) of the positive active material according to Example 1.
Figure 4:
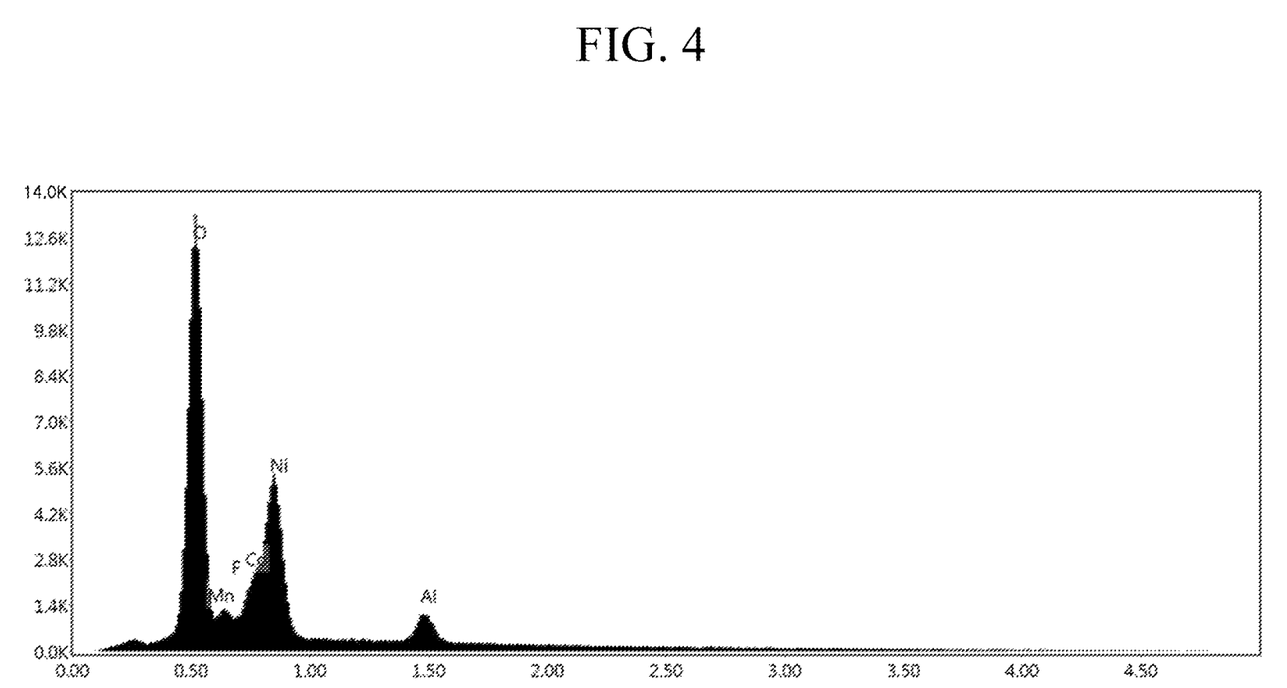
FIG. 4 is a graph showing an XPS analysis result (e.g., spectrum) of the positive active material according to Comparative Example 1.

The result for Example 1 is shown in FIG. 3, and the result for Comparative Example 1 is shown in FIG. 4.

As shown in FIGS. 3 and 4, Al and/or W were both detected on the surface of the positive active material according to Example 1, but only Al was detected on the surface of the positive active material according to Comparative Example 1.

Evaluation 2

SEM micrographs of the surface and cross section of the positive active materials according to Example 1 and Comparative Example 1 showed that a lithium oxide including Al and/or W was present in an island shape on the surface of the positive active material of Example 1, but that a lithium oxide including only Al was uniformly (e.g., substantially uniformly) spread on the surface of the positive active material according to Comparative Example 1.

Evaluation 3

94 wt % of the positive active material according to Example 1 and the Comparative Example 1, 3 wt % of KETJENBLACK®, and 3 wt % of polyvinylidene fluoride were mixed in an N-methyl pyrrolidone solvent to prepare a positive active material slurry.

The positive active material slurry was coated on an Al foil, and dried and compressed to manufacture a positive electrode.

The positive electrode, a lithium metal counter electrode, and an electrolyte were used to manufacture a 2032 coin type half-cell according to a general method. The electrolyte was prepared by dissolving 1.0 M $LiPF_6$ in a mixed solvent of ethylene carbonate and dimethyl carbonate (50:50 volume ratio).

Figure 5:
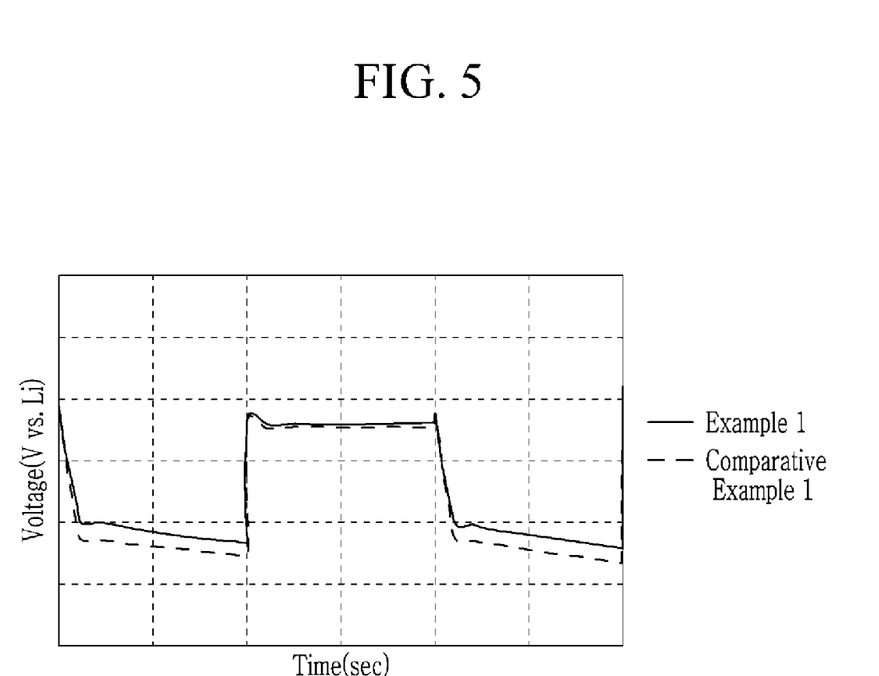
FIG. 5 is a graph showing low temperature outputs of the half cells including the positive active materials according to Example 1 and Comparative Example 1.

The half-cells were once charged and discharged at 0.2 C to evaluate charge capacity, discharge capacity, and charge and discharge efficiency at −10° C., and the results are shown in FIG. 5.

As shown in FIG. 5, the half-cell using the positive active material of Example 1 showed an excellent or improved low temperature output compared with that using the positive active material of Comparative Example 1.

Evaluation 4

The half-cells were repetitively charged 100 times at a high temperature of 45° C. using a constant current/constant voltage (CC-CV) program at 1.0 C (1.0 C=160 mAh/g) to a cut-off condition of 4.3 V and 0.05 C, and discharged using a constant current at 1.0 C to a cut-off condition of 3.0 V to measure discharge capacity. A ratio of discharge capacity at each cycle relative to the discharge capacity at the first cycle was obtained, and the results are shown in FIG. 6.

Figure 6:
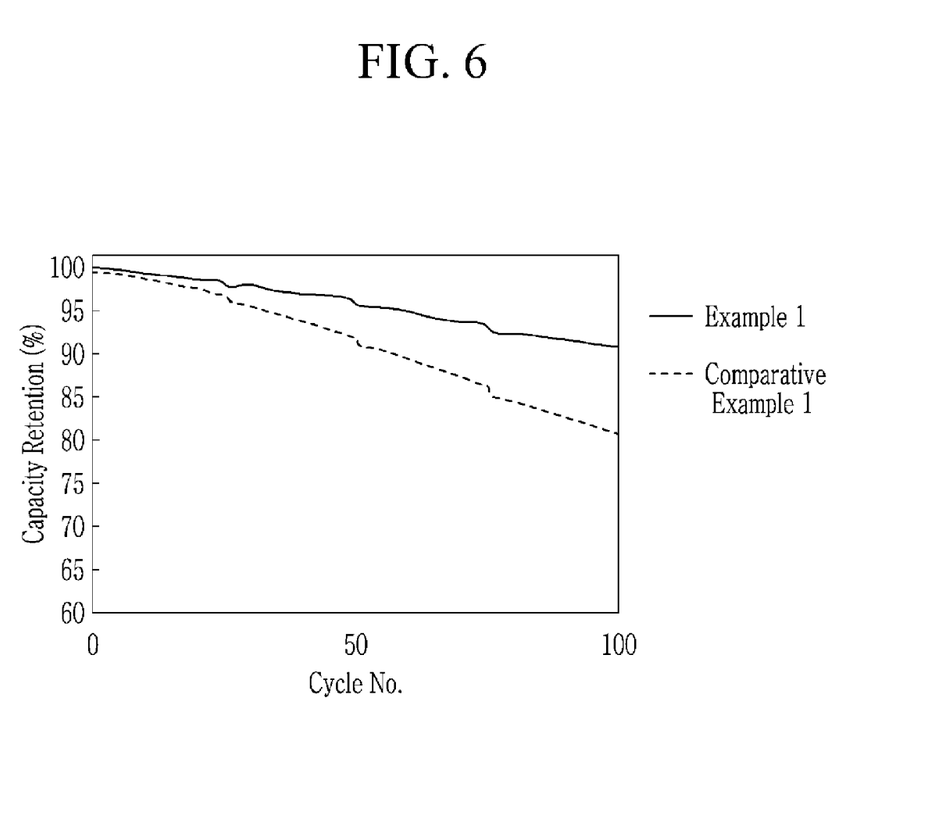
FIG. 6 is a graph showing high temperature cycle-life characteristics of the half cells including the positive active materials according to Example 1 and Comparative Example 1.

As shown in FIG. 6, the half-cell using the positive active material according to Example 1 showed excellent discharge capacity retention at a high temperature compared with that using the positive active material according to Comparative Example 1.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

DESCRIPTION OF SOME OF THE SYMBOLS

1: lithium oxide including Al and/or W
2: lithium nickel-manganese-cobalt composite oxide
10: positive electrode
20: negative electrode
30: separator
40: electrode assembly
50: case
100: rechargeable lithium battery

What is claimed is:

1. A positive active material for a rechargeable lithium battery, comprising:
 a lithium nickel-manganese-cobalt composite oxide, and
 a coating layer on the surface of the lithium nickel-manganese-cobalt composite oxide,
 wherein the coating layer comprises a lithium oxide comprising a lithium aluminum tungstate represented by Chemical Formula 2:

$$Li_aW_bAl_cO_d, \hspace{2cm} \text{Chemical Formula 2}$$

wherein, in Chemical Formula 2, 0.5≤a≤2, 1≤b≤3, 1≤c≤4 and 1≤d≤6.

2. The positive active material of claim 1, wherein the lithium nickel-manganese-cobalt composite oxide comprises nickel in an amount larger than respective amounts of manganese and cobalt.

3. The positive active material of claim 1, wherein the lithium nickel-manganese-cobalt composite oxide is represented by Chemical Formula 1:

$$Li_{a1}Ni_{x1}Co_{y1}Mn_{z1}M_wO_2, \quad \text{Chemical Formula 1}$$

wherein, in Chemical Formula 1, $0.9 \leq a1 \leq 1.25$, $0.4 \leq x1 \leq 0.95$, $0.1 \leq y1 \leq 0.3$, $0.1 \leq z1 \leq 0.3$, $0 \leq w \leq 0.3$, $x1+y1+z1+w=1$, and M is at least one metal selected from B, Li, Mg, Al, Ca, Sr, Cr, V, Ti, Fe, Co, Ni, Zr, Zn, Si, Y, Nb, Ga, Sn, Mo, W, and a combination thereof.

4. The positive active material of claim 1, wherein the lithium aluminum tungstate is a reaction product of at least one selected from $LiAlO_2$, $LiAl_2O_4$, and $Li_2AlO_3$ and at least one selected from $LiWO_3$ and $Li_2WO_3$.

5. The positive active material of claim 1, wherein the coating layer is in an island shape on the surface of the lithium nickel-manganese-cobalt composite oxide.

6. The positive active material of claim 1, wherein the positive active material has an average particle diameter (D50) of about 2 μm to about 10 μm.

7. The positive active material of claim 1, wherein the positive active material has a porous structure.

8. A rechargeable lithium battery, comprising:
a positive electrode comprising the positive active material of claim 1;
a negative electrode comprising a negative active material; and
an electrolyte.

9. The rechargeable lithium battery of claim 8, wherein the lithium nickel-manganese-cobalt composite oxide comprises nickel in an amount larger than respective amounts of manganese and cobalt.

10. The rechargeable lithium battery of claim 8, wherein the lithium nickel-manganese-cobalt composite oxide is represented by Chemical Formula 1:

$$Li_{a1}Ni_{x1}Co_{y1}Mn_{z1}M_wO_2, \quad \text{Chemical Formula 1}$$

wherein, in Chemical Formula 1, $0.9 \leq a1 \leq 1.25$, $0.4 \leq x1 \leq 0.95$, $0.1 \leq y1 \leq 0.3$, $0.1 \leq z1 \leq 0.3$, $0 \leq w \leq 0.3$, $x1+y1+z1+w=1$, and M is at least one metal selected from B, Li, Mg, Al, Ca, Sr, Cr, V, Ti, Fe, Co, Ni, Zr, Zn, Si, Y, Nb, Ga, Sn, Mo, W, and a combination thereof.

11. A battery module comprising:
a rechargeable lithium battery comprising, as a unit battery:
a positive electrode comprising a positive active material of claim 1;
a negative electrode comprising a negative active material; and
an electrolyte.

12. The positive active material of claim 1, wherein the lithium aluminum tungstate is $LiAlWO_4$.

* * * * *